United States Patent [19]

Conca

[11] 4,273,267
[45] Jun. 16, 1981

[54] DEVICE FOR EXTRACTING AND PROPORTIONING PULVERULENT PRODUCTS

[75] Inventor: Gilbert G. Conca, Cabries, France

[73] Assignee: Societe Anonyme dite: Transitube-Project, Aix-en-Provence, France

[21] Appl. No.: 43,719

[22] Filed: May 30, 1979

[30] Foreign Application Priority Data

Jun. 2, 1978 [FR] France ................................. 78 17241

[51] Int. Cl.³ .............................................. B65D 88/54
[52] U.S. Cl. ..................................... 222/318; 198/580;
 198/954; 198/608; 222/412; 222/537; 222/561;
 222/481
[58] Field of Search ............... 222/236, 237, 239, 240,
 222/241, 410-414, 216, 481, 526, 537, 559-561,
 318, 424; 366/158, 186, 296, 344; 198/657, 580,
 954, 608, 671

[56] References Cited

U.S. PATENT DOCUMENTS

| 2,487,533 | 11/1949 | Eastman | 366/158 |
| 2,717,725 | 9/1955 | Bennett | 222/561 |
| 3,155,288 | 11/1964 | Langdraf | 222/413 |
| 3,161,328 | 12/1964 | Haley | 222/561 |
| 3,534,891 | 10/1970 | Bozich | 222/526 |
| 3,724,725 | 4/1973 | Stauffer | 222/240 |

FOREIGN PATENT DOCUMENTS 2358965 6/1975 Fed. Rep. of Germany .

Primary Examiner—H. Grant Skaggs

[57] ABSTRACT

The present invention relates to a device for extracting and proportioning pulverulent products comprising a hopper and coaxial screws with threads of opposite directions, driven in rotation in a cylindrical conduit, which screws are separated from each other by the wall of a tube coaxial to the screws and to the conduit, the screw of smaller diameter rotating inside the tube to convey the product therein in one direction and the screw of larger diameter rotating outside said tube to convey the product in the opposite direction, in the space defined between the tube and the conduit, said latter comprising on its periphery at least one orifice for the flow of the product, wherein said screws are composed of wires helically wound in the manner of a spring, and the tube in which the so-called extraction screw, of smaller diameter, is mounted, comprises on its periphery and on the hopper side an opening for the inlet of the product, in front of which said screws extend at least partially, which product, after having passed through said tube, is taken up by the screw of larger diameter and is transported in opposite direction and to outside the tube, on the hopper side to exert a constant pressure at inlet level, with a view to avoiding the effects of "vault" above the inlet opening and simultaneously to cause the product to pass through an orifice located on the periphery of the conduit.

9 Claims, 8 Drawing Figures

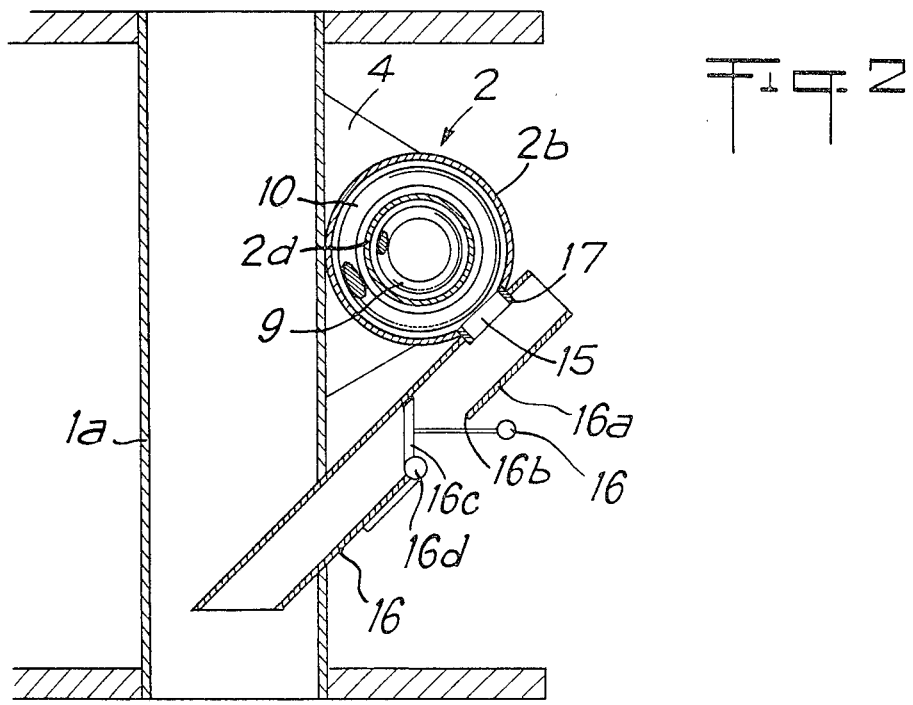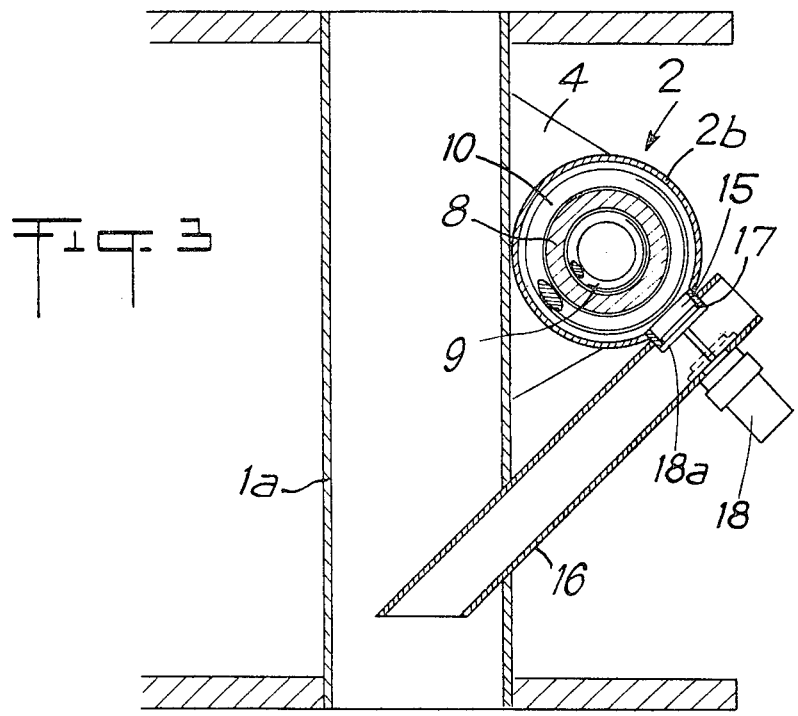

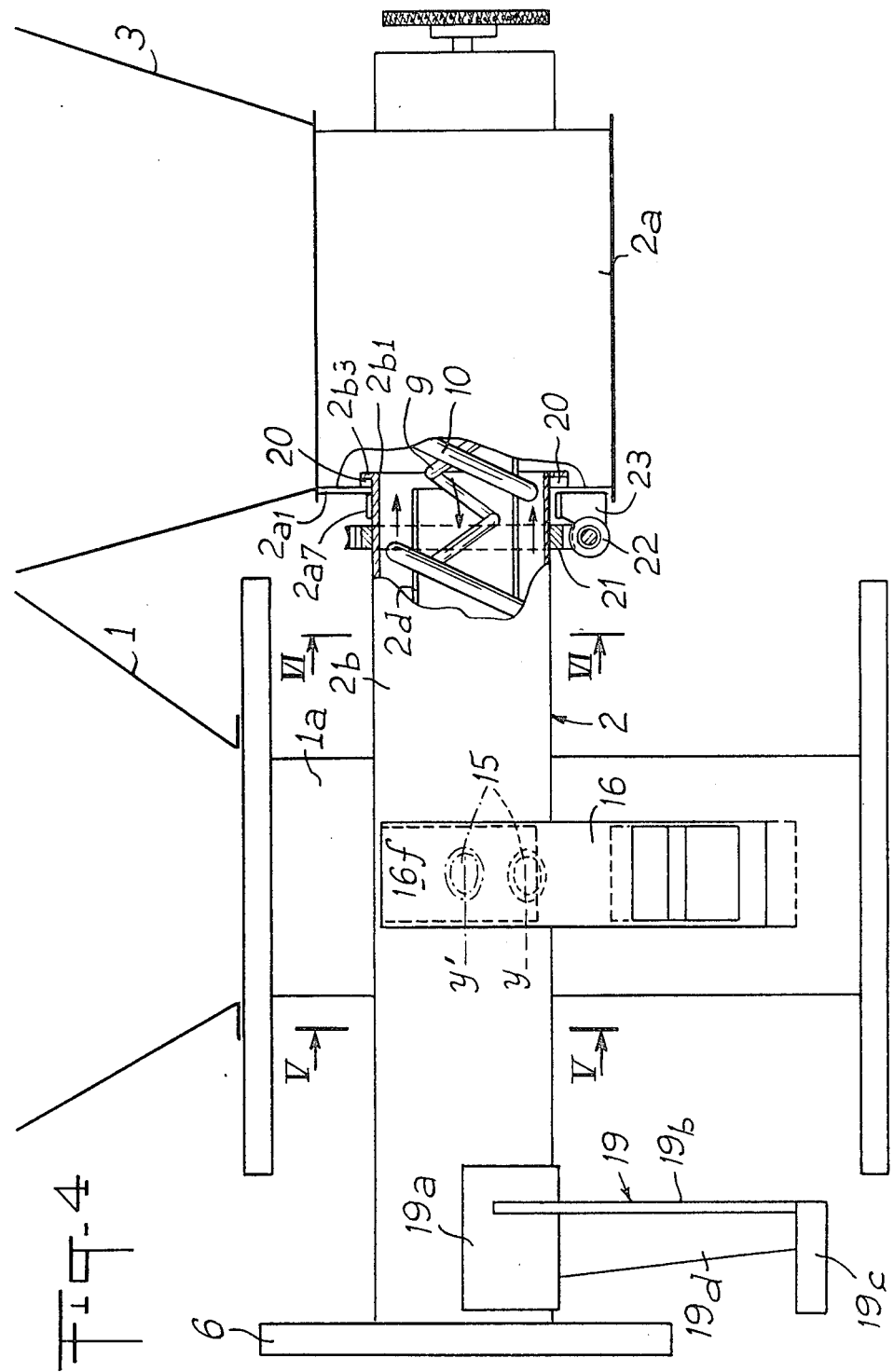

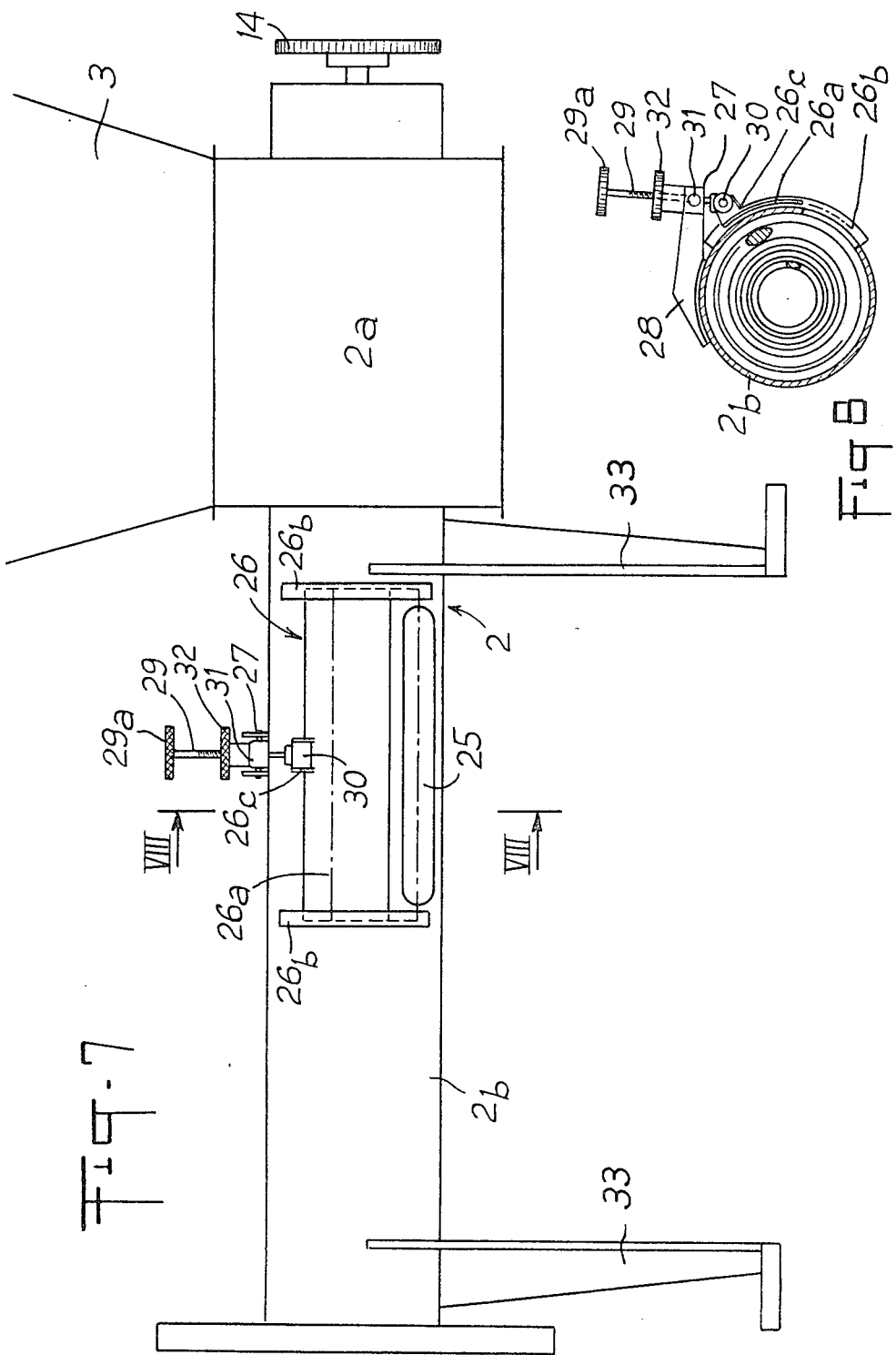

DEVICE FOR EXTRACTING AND PROPORTIONING PULVERULENT PRODUCTS

The present invention relates to a device for extracting and proportioning pulverulent products.

The technical sector of the invention is that of apparatus used for handling pulverulent products.

Proportioning devices with worm are already known for extracting pulverulent products from a hopper. Certain of these proportioning devices comprise a screw mounted to rotate in a conduit, the drive of the screw is generally provoked by a gear down motor, proportioning being obtained by regulating the speed of rotation of the screw. Due to their design, such proportioning devices are of relatively high cost price.

Other proportioning devices of another type comprise a worm driven at constant speed and proportioning is effected by adjusting the opening of the inlet; these proportioning devices have drawbacks: difficulties are encountered during use when powdery products which flow with difficulty are to be proportioned. "Vaults" are created at the inlet and the circulation of the product in the conduit is thus interrupted.

Proportioning devices are also known, which comprise two screws mounted concentrically and driven separately at different speeds of rotation chosen as a function of the characteristics of the products to be proportioned. In such apparatus, the threads of the screws are of the same direction and the so-called "extraction screw", of larger diameter, homogenizes the product, giving it a uniform density and feeds the screw of smaller diameter, called "proportioning screw", which distributes the product at the outlet of the distribution conduit.

These proportioning devices avoid the "vault" effects mentioned hereinabove but are of onerous design.

It is an object of the present invention to remedy these drawbacks.

The object to be attained is a proportioning device of simple design, enabling all pulverulent products of various characteristics to be efficaciously proportioned, whatever their density, granulometry, or humidity.

This object is attained by the device for extracting and proportioning pulverulent products according to the invention which comprises a hopper and coaxial screws with threads of opposite directions, driven in rotation in a cylindrical conduit, which screws are separated from each other by the wall of a tube coaxial to the screws and to the conduit, the screw of smaller diameter rotating inside the tube to convey the product therein in one direction and the screw of larger diameter rotating outside said tube to convey the product in the opposite direction, in the space defined between the tube and the conduit, said latter comprising on its periphery at least one orifice for the flow of the product, in which device said screws are composed of wires helically wound in the manner of a spring, and the tube in which the so-called extraction screw, of smaller diameter, is mounted, comprises on its periphery and on the hopper side an opening for the inlet of the product, in front of which said screws extend at least partially, which product, after having passed through said tube, is taken up by the screw of larger diameter and is transported in opposite direction and to outside the tube, on the hopper side to exert a constant pressure at inlet level, with a view to avoiding the effects of "vault" above the inlet opening and simultaneously to cause the product to pass through an orifice located on the periphery of the conduit.

The invention results in a device for proportioning pulverulent products of various forms: powders of various granulometries, flakes or the like, whatever their degree of humidity.

These apparatus are of very simple design. The screws are driven at the same speed speed by means of a motor or gear-down motor operating at constant speed. In view of the coaxial arrangement of the two screws, of which the threads are in opposite directions, a circulation of the product in the conduit is established in closed circuit. The design of this proportioning device has for its effect to avoid packing at the inlet, the large whorl exerting a constant pressure at the inlet of the product. It procures the possibility of allowing the device to function if, for any reason, the orifice for distributing the product is obturated. The screw of larger diameter creates a dynamic pressure in the conduit, which tends to avoid the "vault" effects which are frequent in apparatus having only one screw. The screw of smaller diameter extracts the product loaded above the proportioning device, and displaces it in the central tube in the direction inlet/free end of said tube, the product is then taken up by the large screw which displaces it in the opposite direction in the conduit of annular section defined by the wall of the central tube and by the outer envelope of the conduit, in the direction free end of the central tube/inlet. The product may be proportioned in various ways. The opening of the obturator of the inlet may be adjusted, adjustment being made as a function of the section of the orifice through which the product flows, which is located on the periphery and in the lower part of the conduit. A remotely-controlled valve may also be used, for example an electromagnetic, pneumatic or like valve, connected to a timing system, which valve opens the section of flow for periods of time recurring at frequencies regulated by said timing device. The flow of the product may also be regulated by lateral displacement in rotation of the flow orifice by pivoting the conduit about its axis of revolution, so that all or part of the section of the flow orifice is covered by the sheet of product conveyed in the lower part of the conduit.

The flow of the product may also be regulated by causing said product to pass through a slot extending along the generatrices of the conduit, and located substantially on the path of the product, this slot being wholly or partly obturated by a curved sheet adapted to move at right angles to the slot, thus constituting a valve.

In this design, the device according to the invention may be used as a powdering device.

The invention will be more readily understood on reading the following description with reference to the accompanying drawings, in which:

FIG. 2 is a schematic view in section along II—II of FIG. 1;

FIG. 3 is a schematic view in section along III—III of a proportioning device comprising an automatic, timed proportioning device;

FIG. 4 is a schematic outside view in elevation/partial section of a device according to the invention in which the flow of the product is regulated by pivoting the conduit and displacing the flow orifice with respect to the sheet of product;

FIG. 7 is an outside view in elevation of a device according to the invention in which the pulverulent product flows through a longitudinal slot whose section may be modified by means of a valve;

FIG. 8 is a schematic view in section along VIII—VIII of FIG. 7.

Figure 1:
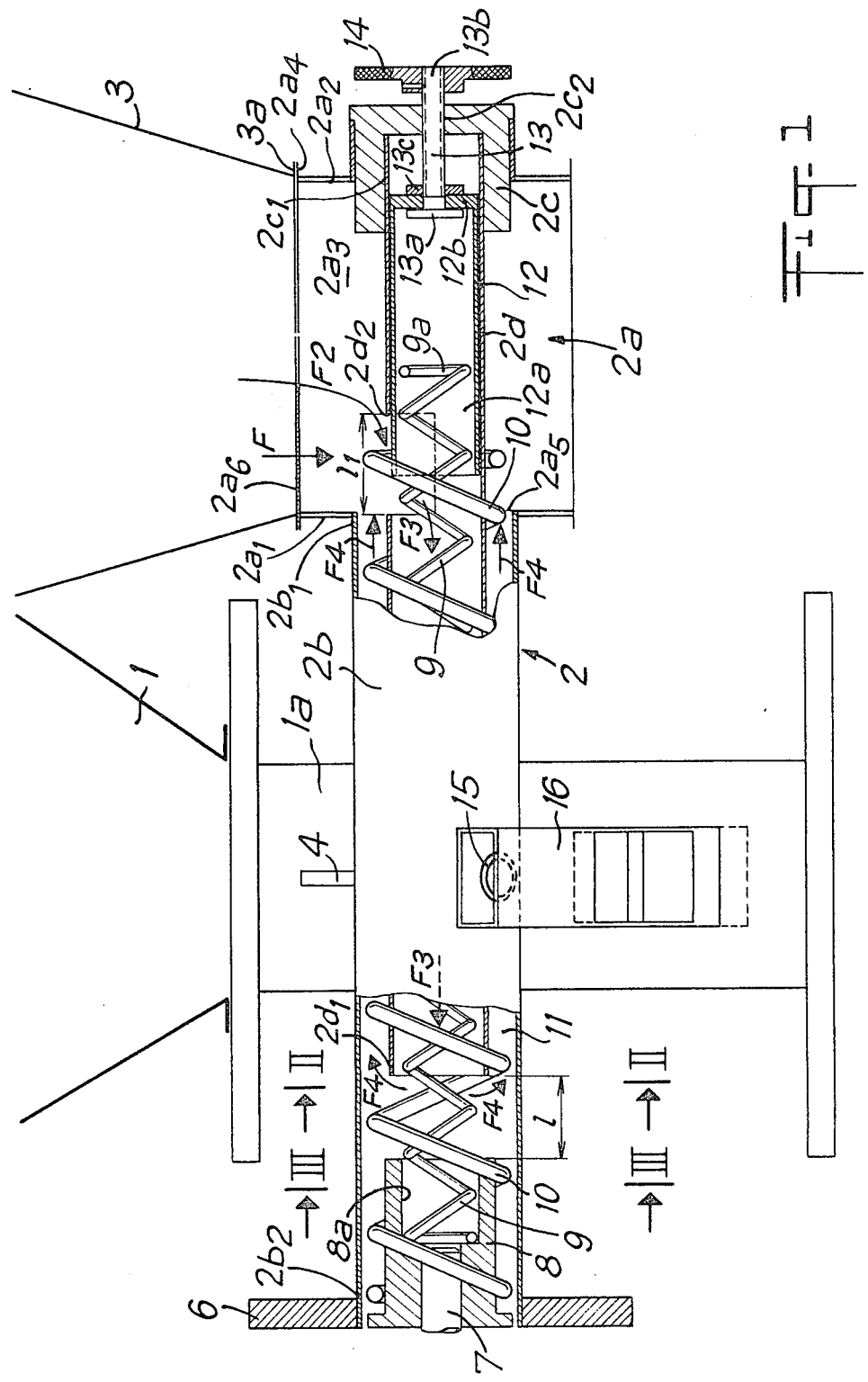
FIG. 1 is a schematic view in longitudinal section through a proportioning device according to the invention comprising a fixed flow orifice of circular section.

Reference will firstly be made to FIGS. 1 and 2 of the drawings which illustrate an embodiment of a proportioning device according to the invention in which the proportioned product, for example a dyestuff, is admitted into the mixing chamber $1a$ of a tank 1, containing for example a resin.

The proportioning device 2 is disposed beneath a hopper 3, filled with dyestuff, which is located near the tank 1. The proportioning device 2 is thus in a horizontal position and is fixed on the one hand to the hopper 3 and on the other hand to the chamber $1a$ of the tank 1 via a support 4, in the present case a bracket fixed to the proportioning device and to the chamber $1a$ by welding.

The proportioning device according to the invention is composed of a trough-shaped part $2a$ adapted to come beneath the hopper 3 and of a cylindrical envelope $2b$ extending horizontally from the trough $2a$, towards the chamber $1a$ of the tank 1. As shown in the drawing, the opening of the trough $2a$ located in its top part is of the same section as that of the lower orifice of the hopper 3.

The trough $2a$ is composed of two parallel end walls $2a_1/2a_2$, and of a side wall forming envelope $2a_3$. The trough is fixed to the hopper 3 by means of two flanges $3a/2a_4$ fixed to the periphery of the lower orifice of the hopper and of the top opening of the trough, which flanges are fixed to each other by means of bolts, for example eight in number.

The wall $2a_1$ comprises a circular opening $2a_5$ from which the cylindrical envelope $2b$ extends. Said latter is engaged by its end $2b_1$ in the opening $2a_5$ and is welded to the wall $2a_1$ so that the envelope $2b$ and the wall $2a_1$ are perpendicular.

The wall $2a_2$ comprises, in line with the envelope $2b$, a cylindrical bush $2c$ fixed to said wall, for example by welding. The bush $2c$ comprises, on the side extending into the trough $2a$, a cylindrical housing $2c_1$ in which a cylindrical tube $2d$ is fitted.

The arrangement of the bush $2c$ is such with respect to the envelope $2b$ that said latter, the bush $2c$ and the tube $2d$ are coaxial.

The tube $2d$ extends inside the trough and over a part of the envelope $2b$. As shown in the drawing, the tube $2d$ extends in the envelope $2b$ over about two thirds of the length thereof.

The end $2b_2$ of the envelope $2b$ comprises a flange 6 fixed by welding, whose function is to ensure the fixing of a motor or geardown motor of which only the driven shaft 7 has been shown in the drawing.

On this driven shaft 7, which is coaxial to tube $2d$ and to envelope $2b$, there is fixed a cylindrical sleeve 8, which comprises a cylindrical housing $8a$ opening out towards the free end $2d_1$ of the tube $2d$ at a distance 1 therefrom, for example 30 mm. An endless screw 9 is forcibly engaged in said housing $8a$ which is coaxial to the envelope $2b$ and to the tube $2d$.

Said screw extends inside the tube $2d$ and its free end $9a$ terminates at about the centre of the trough $2a$.

Around the sleeve 8 there is also forcibly engaged a second endless screw 10, coaxial to screw 9. This screw 10 is thus of a larger diameter than screw 9 and extends in the annular conduit 11 defined by the wall of the tube $2d$ and by the cylindrical envelope $2b$, terminating in the trough $2a$ at a short distance from the orifice $2a_5$, for example 22 mm.

These screws 9/10 are made of spring steel wires of circular or square section and the direction of their thread is opposite. Screw 9 is, for example, a "right-handed" thread screw, screw 10 being a "left-handed" thread screw.

The extraction of the product contained in the hopper 3 is effected by the screw 9, inside the tube $2d$. The product is admitted into said tube through an inlet orifice $2d_2$. This orifice $2d_2$ is made by removing part of the wall of the tube $2d$ after having cut said latter up to its diameter along two parallel planes perpendicular to the axis of the tube. Thus obtained, the orifice, seen in projection in the direction of arrow F, is rectangular in contour. Above this orifice is fixed a wall partly obstructing the inlet opening of the trough $2a$. This wall acts as a deflector to force the product to be admitted into orifice $2d_2$ from the side and thus to avoid any overload on the screw 9.

The opening of the inlet orifice $2d_2$ is regulated by means of an obturator 12.

This obturator 12 is cylindrical and hollow. It is made for example from a tube whose outer diameter is slightly smaller than the inner diameter of tube $2d$ so that it can move freely therein.

One of its ends $12a$ receives the end $9a$ of the screw 9. The latter which has a smaller diameter than the inner diameter of the obturator may thus rotate freely therein. Its other end $12b$ is obstructed by a wall pierced at its centre to allow the passage of a cylindrical shaft 13. This shaft comprises a shoulder $13a$ abutting on the wall $12b$ and is smooth at right angles thereto in order to be able to rotate freely. The shaft 13 is threaded over a part of its length from said smooth part to its end extending outside the trough and thus cooperates with a tapped orifice $2c_2$ made at the centre of the fixed bush $2c$. A gripping member, for example a knurled knob 14, is fixed to its free end $13b$. A stop $13c$, fixed to the shaft 13 holds the wall $12b$ of the obturator 12 with a slight clearance, cooperating with the shoulder $13a$. It will be understood that, when the knurled knob 14 is rotated, the obturator 12 is displaced in translation without being driven in rotation, its stroke being equal to the length $l_1$ of the inlet orifice $2d_2$.

The flow orifice 15 for the proportioned product is located on the periphery of the envelope $2b$, in its lower part and about half-way along said envelope.

Said orifice 15 opens out into a flow spout 16 which is for example rectangular in section and which is inclined and penetrates (FIG. 2) in the chamber $1a$ of the tank 1.

The orifice 15 is inclined by 45° with respect to the vertical plane passing through the longitudinal axis of the proportioning device, the inclination of the spout 16 is a function of the angle of flow of the proportioned product.

In order to obtain the exact proportioning of the product, the opening of the inlet orifice $2d_2$ is adapted as a function of the section of the orifice 15. To this end, a set of adaptable calibrated nozzles 17 at right angles to the flow orifice for the product is employed.

The spout 16 comprises a flow monitoring device. It thus comprises on its wall 16a, on which the proportioned product flows, a rectangular opening 16b. This opening 16b may be covered by a flap 16c pivoted at 16d along one of the edges of the opening 16b about an axis parallel to the axis of the proportioning device. This flap has two positions, so that, in one, it may be folded against the wall 16a and thus cover the opening 16b, allowing the product to flow in the spout 16 and, in the other, shown in FIG. 2, it may be in raised position so as to cover the section of said spout and uncover the opening 16. The product flowing through said latter may be removed and, as a function of the time of flow, the quantity of proportioned product may be determined.

According to another embodiment, illustrated in FIG. 3, the product is proportioned by means of an automatic device.

In such a proportioning device, the orifice 15 is of determined section, for example as a function of the maximum flow resulting from the possibilities of the proportioning device. A first adjustment may be made at the inlet orifice $2d_2$.

This proportioning device comprises an electromagnetic valve 18 of which the obturator 18a obturates or uncovers the section of the orifice 15 completely. This valve 18 is connected to an adjustable timing system. As shown in the drawing, the valve 18 is disposed perpendicularly to the wall 16 of the conduit.

The functioning of a proportioning device according to the invention is as follows.

The pure product, for example a resin, is stored in the tank 1 and flows into the chamber 1a. The product to be proportioned, for example a dyestuff, is contained in a hopper 3.

This dyestuff is also contained in the trough 2a.

The motor, by its driven shaft 7, rotates the two coaxial screws 9/10 fixed to the sleeve 8, at the same speed. The speed of rotation is about 1500 r.p.m.

Under the effect of the extraction screw 9, disposed inside the tube 2d, the product to be proportioned, admitted through the orifice $2d_2$, is taken along in the direction of arrows F3. The horizontal wall $2a_6$, disposed above said orifice $2d_2$, avoids overloading the screw at right angles thereto and obliges the product to adopt the circuit indicated by arrow F2.

The flow is regulated by manoeuvring the wheel 14 which, rotated in one direction or in the other, tends to provoke the lateral displacement of the obturator 12 with a view to regulating the opening of the inlet orifice $2d_2$.

When the product arrives at the end $2d_1$ of the tube 2d, it is taken up by the large screw 10 and adopts the circuit indicated by arrows F4. It is thus moved towards the trough 2a to be taken up again by the screw 9 in the direction of arrow F3.

During the whole of this recycling, only a part of the dyestuff passes through the flow orifice 15, the quantity of product poured being a function of the section of the nozzle disposed at right angles to said orifice.

The proportioning device according to the invention may be equipped with one of the evacuation devices illustrated in FIGS. 2 and 3.

Figure 5:
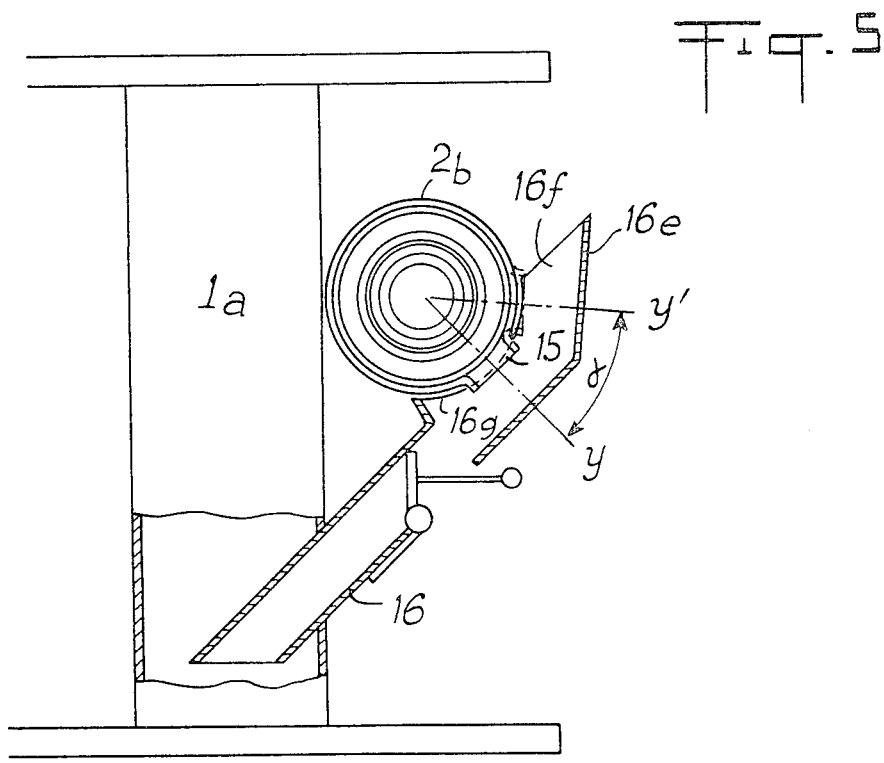
FIG. 5 is a schematic view in section along V—V of FIG. 4.
Figure 6:
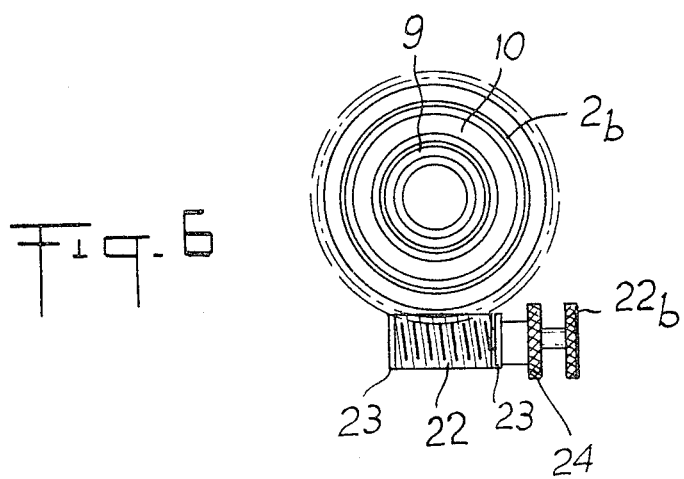
FIG. 6 is a schematic view in section along VI—VI of FIG. 4.

Reference will now be made to FIGS. 4, 5, 6 of the drawings, which illustrate another embodiment of the device according to the invention, which is equipped to obtain the adjustment of the flow of the product by lateral displacement in rotation of the flow orifice 15.

In this embodiment, the conduit 2b which comprises the orifice 15 is mounted to rotate in the trough 2a and abuts at its other end on a support 19. The trough 2a thus comprises a flange $2a_7$ extending on the conduit 2b side, which flange is of slightly larger diameter than the outer diameter of the conduit.

Said latter comprises at its end $2b_1$ an edge $2b_3$ bent back at 90°, extending over its periphery. A seal 20 is inserted between the wall $2a_1$ of the trough and the bent back edge $2b_3$.

The support 19 comprises a curved sheet 19a whose diameter is slightly larger than that of conduit 2b, which sheet 19a forms a cradle and is welded at the top end of a support formed by a flat bar iron 19b comprising at its other end a base 19c. A reinforcing web 19d is welded to the lower part of the cradle 19a, the flat bar 19b and the base 19c.

The conduit 2b comprises near the flange $2a_7$ of the trough a ring gear 21 which is fixed to the outer periphery of the conduit. This ring 21 cooperates with an endless screw 22. The toothing of the ring and of the screw is micrometric, with the result that a fine adjustment of the proportioning may be obtained.

The endless screw 22 is mounted in a fork joint 23 fixed to the trough 2a. The shaft 22a of the screw 22 is threaded and comprises at its free end a knurled control knob 22b.

A nut 24, knurled on its periphery, enables the endless screw 22 to be locked in position when the conduit is placed in the desired position. This nut is located between the fork joint 23 and the knob 22b and may be placed in abutment on or remote from the fork joint 23.

The flow orifice 15 (FIG. 5) is displaced downwardly or inversely by the rotation of the conduit 2b under the effect of the micrometric ring gear 21/endless screw 22 assembly described previously.

The extreme positions y/y' of the orifice 15 are shown in the drawing and the angle of movement $\alpha$ is preferably 30°. However, the rotation of the conduit 2b about its axis of revolution is not limited and it is therefore possible to obtain extreme positions y/y' forming an angle $\alpha$ of more or less than 30°, whilst remaining within the reasonable limits for a suitable functioning of the device.

In view of the design of the apparatus and in order to allow the flow of the proportioned product in the spout 16, the latter is open and flared at its upper part 16e located opposite the orifice 15, so that whatever the position of said orifice, the product is always collected by the spout. The side walls 16f are indented at 16g and are tangential to the outer face of the conduit 2b.

It will be noted that the flow of the proportioned product could also be obtained by means of a flexible tube connected on the one hand around the orifice 15 and on the other hand around a connection fixed for example to the mixing chamber 1a.

Reference will now be made to FIGS. 7 and 8 of the drawings, which illustrate another embodiment of the device according to the invention.

As shown in the drawings, the conduit 2b is fixed to the trough 2a above which the hopper 3 is fixed.

The whole is carried by two supports 24 fixed to the ends of the conduit, near the flange 6 and the trough 2a.

The conduit 2b comprises in its lower part a slot 25 made on the periphery and in the direction of the generatrices of the conduit. The inclination of the slot 25 is, like that of the orifice 15 illustrated in FIGS. 1 to 3 of the drawings, about 45° with respect to the vertical plane passing through the longitudinal axis of the device.

Said slot 25 may extend over all or part of the conduit 2b. In the example illustrated in FIG. 7, it extends from the median part of the conduit 2b to near the support 24 located towards the trough 2a. This slot 25 has a width which is a function of the granulometry of the product. It may be of the order of 1.5 to 10 mm.

To allow a fine proportioning of the product, the slot may be partly covered by a valve 26 adapted to move in front of it. This valve consists of a curved sheet 26a with a diameter slightly larger than the outer diameter of the conduit 2b, which sheet slides by its lateral ends in two curved guides 26b applied and fixed on the periphery of the conduit. At its centre and in its upper part, the sheet 26a is connected to a micrometric control member in order to obtain a precise regulation of the position of the valve 26 with respect to the slot 25.

Said control member is pivoted on the one hand in a fork joint 26c, fixed to the sheet 26a and on the other hand in another fork joint 27 located at the end of a bracket support 28 fixed for example by welding to the upper part of the conduit 2b.

The valve is manoeuvred by a micrometric screw 29 comprising a knurled knob 29a at its top end. Its lower end is mounted to rotate freely, without being able to disengage itself therefrom, in a block 30 pivoted in the fork joint 26c on two pivot pins engaged in the orifices of said fork joint.

The screw 29 cooperates with a nut 31 mounted in similar manner to the block 30 and comprising two pivot pins on either side engaged in the orifices of the fork joint. A knurled nut 32 inserted between the pivoting nut 31 and the control knob 29a enables the screw to be locked when the sheet 26a is in the suitable position.

In this embodiment, the proportioning device according to the invention finds particular application as powdering device.

It will be noted that the valve 26 may be controlled by two control members disposed at its ends in order to avoid any jamming during manoeuvring thereof, particularly if this valve is long.

The parts of the device which have just been described by way of example may, of course, be replaced by equivalent parts performing the same function, without departing from the scope of the invention.

What is claimed is:

1. In a device for extracting and proportioning pulverulent products comprising a hopper and coaxial screws with threads of opposite directions, means for driving said screws in rotation in a cylindrical conduit, said screws being separated from each other by the wall of a tube coaxial to the screws and to the conduit, the screw of smaller diameter rotating inside the tube to convey the product therein in one direction and the screw of larger diameter rotating outside said tube to convey the product in the opposite direction in the space defined between the tube and the conduit, said conduit comprising on its periphery at least one orifice for the flow of the product, said screws being composed of wires helically wound in the manner of a spring, and the tube in which the screw of smaller diameter is mounted, comprising on its periphery and adjacent the hopper an opening for the inlet of the product, in front of which said screws extend at least partially, said product, after having passed through said tube, being taken up by the screw of larger diameter and being transported between said tube and said conduit in the direction towards the hopper to exert a constant pressure at said opening, to avoid the effects of "vault" above the inlet opening and simultaneously to cause the product to pass through said orifice located on the periphery of the conduit.

2. The device of claim 1, wherein the conduit is substantially horizontal and extends from a trough fixed to the lower part of said hopper, said inlet opening being oriented towards the hopper, said tube inside which the screw of smaller diameter is mounted to rotate extending over at least the whole of the length of the trough, and a valve including a cylindrical obturator coaxial with respect to said tube and mounted to slide therein for moving in front of the inlet opening, said obturator being controlled by a gripping member to which it is connected.

3. The device of claim 2, wherein the obturator is hollow to receive the free end of the screw of smaller diameter and which is mounted to rotate inside said obturator.

4. The device of claim 1 wherein the orifice comprises a calibrated orifice and the conduit is mounted to rotate with respect to the trough and comprises means for causing it to pivot about its axis of revolution in order to displace said orifice laterally and to move it away from or towards the product moving in the lower part of the conduit, said calibrated orifice opening out into a spout which pours the proportioned product into a mixing chamber.

5. The device of claim 4, wherein the conduit comprises a ring gear fixed on its periphery which cooperates with a micrometric endless screw mounted in a support fixed to the trough, said micrometric screw being immobilized by means of a lock nut abutting on said support.

6. The device of claim 4, wherein said spout comprises, downstream of the calibrated orifice, an opening which may be obturated by a two-position flap, so that, in one position, the flap obturates the opening so that the product flows through the spout into the mixing chamber and, in the second position, it obturates a section of the conduit so that the product passes through said opening with a view to monitoring the rate of flow of the proportioning device.

7. The device of claim 4, wherein the spout comprises, downstream of the calibrated orifice, a remotely controlled valve which respectively totally obturates or uncovers a section of the opening, said valve being connectable to a timing device.

8. The device of claim 1, wherein the orifice is a slot extending over at least a part of the length of the said conduit.

9. The device of claim 8 wherein the slot is totally or partly covered by a valve moving in front of it and in a parallel direction with said conduit which valve is actuated by means of at least one control device employing a micrometric screw mounted on a support fixed to the conduit, said micrometric screw being adapted to be immobilized by means of a lock nut abutting on said support.

* * * * *